CORE DEVICE

Filed Dec. 14, 1962 2 Sheets-Sheet 1

INVENTOR.
JOHN A. SWANSON
BY
Curtis, Morris + Safford

Jan. 10, 1967 J. A. SWANSON 3,298,003

CORE DEVICE

Filed Dec. 14, 1962 2 Sheets-Sheet 2

INVENTOR.
JOHN A. SWANSON
BY
Curtis, Morris + Safford

United States Patent Office 3,298,003
Patented Jan. 10, 1967

3,298,003
CORE DEVICE

John A. Swanson, Mountain View, Calif., assignor to AMP Incorporated, Harrisburg, Pa.
Filed Dec. 14, 1962, Ser. No. 244,608
10 Claims. (Cl. 340—174)

This invention relates to an improved multi-path magnetic core circuit of the type utilized to store and manipulate intelligence.

A substantial number of known multi-path magnetic core devices employ an input technique wherein a binary "one" is represented by a relatively large pulse and a binary "zero" is represented by the lack of a pulse. With such devices an input winding is included coupling a core major path in a manner whereby a "one" input will produce an MMF exceeding the core path threshold driving the core material in such path into positive saturation; the core then being considered as containing a "one." A "zero" input will, of course, produce no MMF and will therefore leave the core undisturbed. This technique, while highly satisfactory in many applications, cannot be used in non-destructive read-out circuits requiring the common use of input and output windings with respect to a number of different cores. The reason for this becomes obvious when it is realized that a "one" input to a common input winding will disturb each core threaded by such winding even though certain of the cores should, for a given function, contain "zeroes."

One approach to the problem created by commoned input windings has been the use of coincident current techniques wherein the input windings are formed of separate windings, each being supplied with approximately half the current necessary to produce an MMF exceeding core threshold. The problem with the coincident current technique is that it increases the number of windings required for each core which in turn increases the cost of production and requires the addition of complicated peripheral equipment; each additional winding requiring an additional drive component. Additionally, with respect to the memory planes, the use of coincident current input windings complicates read-out and access.

In either event, the many advantages of multi-path magnetic core devices over simple toroid core devices are substantially negated.

Another approach to the problem involves the use of multi-aperture cores driven to operate in accordance with the so-called MAD–R (Multi-aperture Device-Resistance) technique as shown in the U.S. Patent No. 2,995,731, to Joseph P. Sweeney. Unfortunately, this approach while highly satisfactory in most logic applications is limited in memory plane use by the necessity of commoned windings. Moreover, the MAD–R technique requires a control of driver current amplitude which is more critical and hence more expensive than the economies of memory plane application permit. The limitation placed on the minor aperture drive currents such as the "prime" circuit make the usual MAD–R approach unsuitable for coordinate core memory planes.

Accordingly, it is one object of the present invention to provide an improved multi-path magnetic core circuit capable of being driven to store and manipulate intelligence by commoned drive and output windings.

It is a further object of invention to provide a multi-aperture core circuit relatively insensitive to excess drive current pulse amplitude.

It is a further object of invention to provide an improved input circuit and mode of operation for multi-path magnetic core devices.

It is a still further object of invention to provide a multi-path magnetic core device capable of considerable intelligence content with a non-destructive read-out capability.

It is another object of invention to provide a multi-path magnetic core storage matrix capable of high speed storage and access of multi-bit words.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing objects are attained by the present invention through the use of a novel input and output technique. Utilizing a standard multi-path magnetic core geometry the binary "one" state is generated within a core by either of two possible stable states of magnetization employing different paths of magnetic material driven into a positive remanent state of saturation. The binary "zero" state employed by the invention is produced by a finite MMF rather than the absence of MMF as used in the technique of the prior art. The input windings employed by the invention are such that a binary "one" may be written into a given core by the presence of a pulse on one winding and a binary "zero" may be written into a given core by the presence of pulses on different windings. The characteristics of the input pulses and windings are such that the energization of the "zero" input winding will drive a core into the "zero" state without destroying a "one" in an adjacent core threaded by the "zero" input winding. This is made possible by the use of two distinct stable states capable of representing a "one" within a core. The output windings of the invention are such that the energization of a "prime" winding and a "read" winding will produce a "one" output which is substantially identical when the core is in either of the stable states representative of the "one" condition. The arrangement and sense of "read" and "prime" windings in conjunction with a "controlled" pulse rise time operate to prevent the intelligence state of the core from being altered by excessive "prime" or "read" pulse amplitude. Because of the foregoing, numerous storage and logic applications demanding commoned input windings may now be achieved in a multi-aperture core device with a non-destructive read-out capability and without the usual sensitivity to "read" and "prime" pulse variation.

In the drawings:

FIGURE 1 is a schematic diagram of a multi-path magnetic core threaded by windings to form a circuit in accordance with the invention;

FIGURE 1–A is a time sequence diagram of the pulses utilized by the circuit of the invention;

Figure 1:
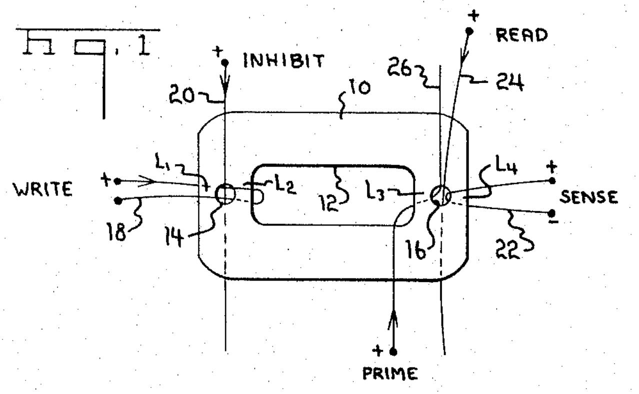
Figure 1A:
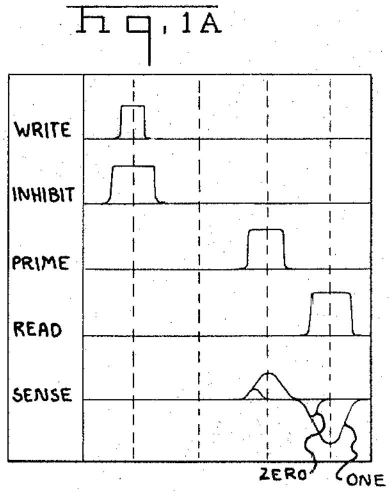

Referring now to FIGURE 1, there is shown a magnetic core 10 of generally rectangular shape having a major aperture 12 and minor apertures 14 and 16 generally symmetrically disposed with respect to core material width. Cores of this type are commercially available in a number of magnetic materials exhibiting a substantially square hysteresis characteristic loop and capable of being driven by applied MMF into a number of distinct stable states of magnetization. The relative positions of apertures 12, 14 and 16 may be considered to define paths of magnetic material permitting flux closure and a controlled positive or negative saturation of the magnetic material in such paths.

Intelligence in the binary form of "one" or "zero" may be assigned to a given stable state and input and output windings may be differentially applied to the core paths capable of generating such states by the application of an MMF to a given path. In a similar manner, output windings linking the core may be utilized to develop output signals responsive to localized flux changes caused by stable state changes within the core responsive to an MMF developed by a read-out winding.

With respect to the core and circuit of FIGURE 1, the stable state wherein the core is negatively saturated may be assigned as the Zero intelligence state. The One intelligence state may be assigned a stable condition of magnetization wherein substantially half the core material in a path about the core major aperture is negatively saturated, the other half being positively saturated. These assignments may be represented by flux arrow diagrams showing the orientation of flux in portions of core paths adjacent each minor aperture in the manner depicted in FIGURE 2. Such diagrams show not only the orientation of flux existing when the core is in a given stable state but also the orientation of flux necessary to achieve such states. As is generally understood, the states represented in FIGURE 2 may be achieved in core 10 by the application of an appropriate MMF to a given path of magnetic material; the particular path of core material switched by such MMF being determined by the placement of the source of such MMF and by the threshold of the path or paths with respect to such placement. Thus, with respect to the circuit of FIGURE 1, windings 18 and 20 may be positioned and selectively energized to accomplish intelligence input by generating individual or net MMF's operating on different major core paths about aperture 12 to cause material switching and flux orientation representing either a binary "one" or "zero." Similarly, the individual energization of windings 24 and 26 by appropriate pulses may be utilized to produce an MMF operating to switch flux locally in a path of magnetic mateial about aperture 16 to effectively sample the partciular state of the core by causing relatively large flux changes in leg $L_4$ if the core is in the One state and relatively small flux changes in leg $L_4$ if the core is in the Zero state. Output winding 22 linking leg $L_4$ will experience such flux changes and thereby develop an induced voltage proportional to the rate of change of flux and the quantity of flux switched to produce an output signal representing either a "one" or a "zero."

Figure 2:
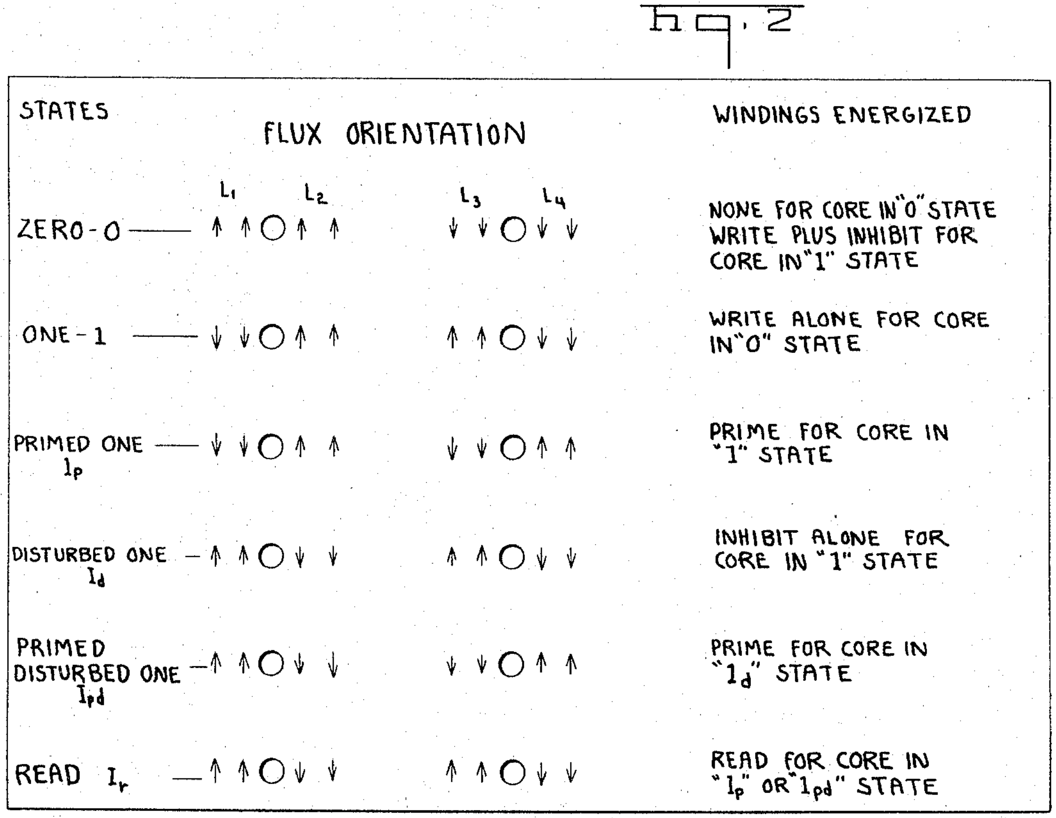
FIGURE 2 is a schedule showing the orientation of flux achieved in the various stable states during the operation of the circuit of FIGURE 1.

Referring to the circuit of FIGURE 1 in more detail and considering the core to be in the Zero state depicted in FIGURE 2, it will be noted that the winding 18 includes an effective two turns passing up through aperture 14 and one turn passing down through aperture 12 with respect to the polarity shown. A "one" input pulse on winding 18 will therefore produce an MMF operating on a major path including legs $L_1$ and $L_3$ in an anti-clockwise sense and on a major path including legs $L_2$ and $L_4$ in a clockwise sense with the flux orientation shown for the One state in FIGURE 2. Considering that the input pulse amplitude applied to winding 18 and the number of turns linking the core combine to produce an MMF exceeding the material threshold of these paths, flux switching will occur leaving the core in a remanent state with substantially half the core material positively saturated and substantially half the core material negatively saturated, which state represents the storage of "one." A binary "zero" may be written into core 10 by the simultaneous energization of winding 20 and winding 18 by employing an input pulse on winding 20 considerably larger than that used on winding 18 to develop an MMF approximately twice that developed by winding 18. The net MMF operating on the core will be an effective one unit driving the path including legs $L_1$ and $L_3$ in the clockwise sense as indicated by the flux diagrams shown adjacent the Zero state in FIGURE 2. The core will thus be driven to the Zero state. Summarizing, core 10 may be driven to store a "zero" by the combined energization of windings 18 and 20 or may be driven to store a "one" by the energization of winding 18 alone. For the purpose of explaining the technique hereinafter described with respect to FIGURES 3 and 4, it is well to consider the operation of the circuit of FIGURE 1 when the core is in the One state and winding 20 is energized alone. In this event, with winding 18 unenergized, the turns of winding 18 threading aperture 12 will not produce an MMF operating to hold material in leg $L_2$ in the clear state and the MMF applied by winding 20 will see an available path in a clockwise sense about aperture 14. Core 10 will therefore be driven into a state with flux orientation as depicted in the Disturbed One state shown in FIGURE 2, the orientation of flux adjacent aperture 16 remaining the same.

Considering now the read-out cycle of the circuit of FIGURE 1 it will be recognized that a voltage will be induced on winding 22 proportional to the rate of change of flux and the quantity of flux switched in leg $L_4$. It will be further appreciated that changes in flux in leg $L_3$ will not affect winding 22. Referring to FIGURE 1–A the pulse application required for read-out with reference to time is indicated. Following the application of the write and/or inhibit pulses driving the core into either the One or Zero state in the manner above described, the read-out or sense cycle is comprised of an application of a prime pulse followed by a read pulse. Contrary to the prior art approach wherein the prime pulse was carefully limited to a relatively low amplitude applied over a relatively long period of time the partcular sense employed for winding 26 permits the use of a relatively large prime pulse. The sense winding 22 by being made polarity sensitive will ignore the voltage developed by priming. The read pulse may be similar to the prime pulse but of an opposite polarity relative to the read aperture 16. This will result in a rapidly applied MMF causing a rapid flux change in $L_4$ to thereby induce a voltage in sense winding 22. The voltages so developed in sense winding 22 will be relatively large when remanent flux is rapidly switched and relatively small when only elastic flux is switched.

Considering core 10 to be in the One state shown in FIGURE 2 the application of prime current on winding 26 will serve to switch flux about aperture 16 reversing the sense of orientation in legs $L_3$ and $L_4$ from that shown for the One state to that shown for the Primed One state. The amplitude of the prime current and the number of turns employed in winding 26 need not be limited so as to produce an MMF substantially less than the threshold of a path about major aperture 12 but greater than the threshold of a path about aperture 16 when the core is in the One state. This is because the prime MMF cannot operate to disturb a core major path in any event since the prime MMF will tend to switch flux downwardly in $L_3$. If core 10 is in the One state the prime pulse could cause a flux loss through flux "spreading" but this effect may be substantially eliminated by making the prime pulse rise time relatively slow as indicated in FIGURE 1–A. Considering core 10 to be in the Disturbed One state shown in FIGURE 2 the application of prime current to winding 26 will operate as above described to switch flux about aperture 16 driving the core into the Primed Disturbed One state from the Disturbed One state.

Following the application of prime current the core 10 will invariably be in either the Zero state, the Primed One state, or the Disturbed Primed One state. The application of read current on winding 24 may be then applied as indicated in FIGURE 1–A to complete the read-out cycle utilized by the invention. The amplitude of the read current and the number of turns employed in winding 24 must produce an MMF sufficient to overcome the threshold of a path about aperture 16 when the core is in either the Primed One or Disturbed One states but need not be higher than the threshold of such path present when the core is in the Zero state. Upon the application of the read pulse, the sense of orientation of flux in legs $L_3$ and $L_4$ will be driven from that shown in the Primed One or Primed Disturbed One states to that shown in the Read state, FIGURE 2. Thus in each instance wherein the core contains a "one," flux will be rapidly switched in leg 4 linked by sense winding 22 and a relatively large voltage will be thereby induced capable of representing an output of "one." The application of a read pulse to winding 24 when the core is in the Zero state will serve to switch only elastic flux about aperture 16 and will thereby induce only a very small voltage and output signal on sense winding 22; which signal will represent an output of "zero" as indicated in FIGURE 1–A. Summarizing, readout may be accomplished by the successive application of prime MMF followed by a rapidly developed read MMF. If the core is in the Zero state with clockwise flux orientation in legs $L_3$ and $L_4$, the prime and read MMF's will switch only elastic flux and induce an insubstantial voltage in sense winding 22. On the other hand, if the core is in either the One or Disturbed One state, the application of prime MMF will force flux to be set in leg $L_4$ which flux will be switched by the read pulse in a path about aperture 16 with a resulting substantial voltage induced on sense winding 22.

Figure 3:
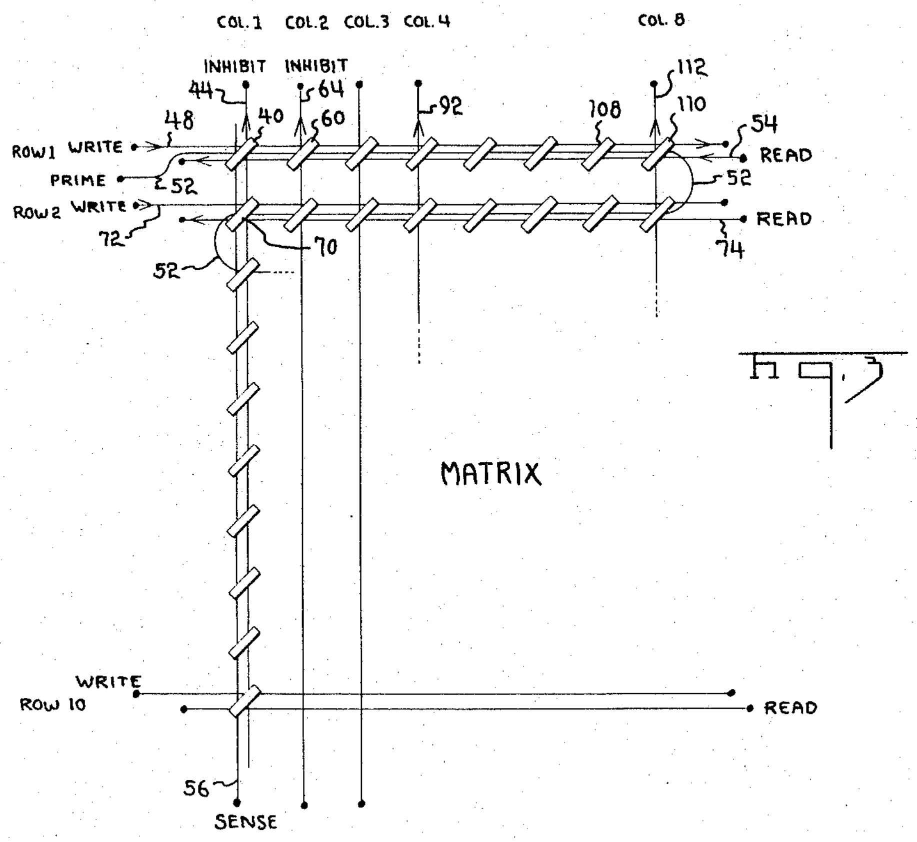
FIGURE 3 is a schematic diagram of a multi-path magnetic core matrix typifying one use of the invention.
Figure 4:
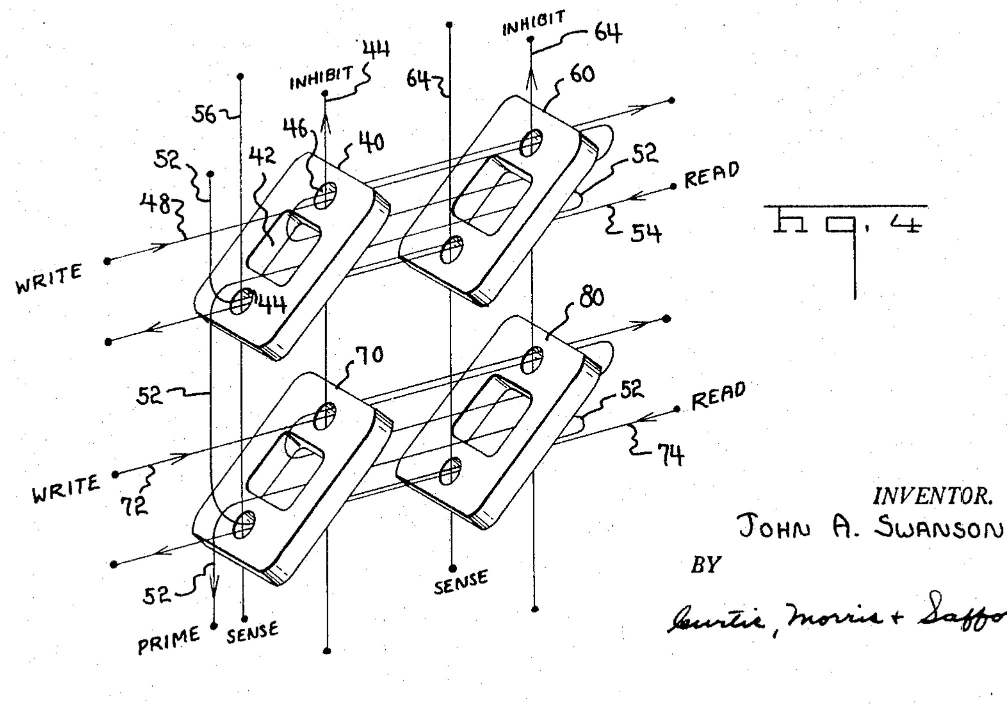
FIGURE 4 is an enlarged perspective view of a portion of the multi-magnetic core matrix of FIGURE 3.

Referring now to FIGURE 3 there is shown an 80 bit matrix utilizing the circuit of the invention. The general function of the core matrix may be considered as that of storing in binary form ten or less words each composed of eight or less bits with a capability of non-destructive readout on a word by word basis. With respect to FIGURE 3, each row represents one word position with each core in each row representing the bit position for each bit of the row word. Each row may be considered as having an individual write winding such as winding 48 for Row 1, an individual read winding, such as winding 54 for Row 1 and a common prime winding such as winding 52 threading Row 1 and all of the remaining rows 2 through 10. Each bit position for each row may be considered common to a column as for example the first or leftmost bit position of each row is shown as common to Column 1 in FIGURE 3. Each core of such bit position in a given column is threaded by an inhibit winding such as 44 in Column 1 and a sense winding such as 56 in Column 1. The particular MMF relationships utilized in the circuit of FIGURE 3 are substantially identical to that described with respect to the circuit of FIGURE 1. The principle difference in windings employed in the circuit of FIGURE 3 is indicated in FIGURE 4 wherein such windings are shown as commoned with respect to a number of cores in a linear fashion rather than lumped on a single core. For example, the write winding 48 includes an effective two turns through the input aperture 46 of core 40 and one turn in a reverse sense through the major aperture 42 of such core with this same turns ratio being carried out by winding 48 with respect to the input and major apertures of each core of Row 1 as is shown with respect to core 60. The inhibit winding 44 includes an effective one turn through the core input aperture 46 of core 40 and of each core in Column 1 as in the manner shown with respect to core 70. Similarly, the sense winding 56 passes through the output aperture 44 of core 40 and the output aperture of the other core of Column 1 with an effective one turn. The similarity of operation of any one of the cores shown in the circuit of FIGURE 3 to the single core shown in FIGURE 1 should thus be apparent. The necessary pulses and pulse characteristics to accomplish write, inhibit, prime, and read as well as the sense signal developed thereby must of course have the characteristics heretofore described to accomplish the desired operation. As an additional advantage of the circuit of the invention it is to be noted that not only the write and inhibit current amplitudes have no critical maximum values, but also the prime and read pulses are free from amplitude controlling.

With respect to the circuit and core matrix of FIGURE 3 each of the write, inhibit, and read windings may be considered as connected to an individual driver capable of producing appropriate pulses responsive to triggers supplied by any suitable trigger source. The prime winding threading each core of the matrix may be connected to a prime driver capable of producing prime pulses responsive to a trigger developed in any suitable manner. Each of the sense windings may be considered as connected to an individual circuit capable of utilizing the intelligence developed in such sense winding. For example, each of the sense windings may be connected to an indicating device including a signal lamp adapted to be energized when the sense winding produces an output of "one" and not energized when the sense winding produces an output of "zero." Alternatively, the sense windings may be individually connected to circuits causing the particular output to be printed by graphic, magnetic or other suitable means.

The operation of the matrix of FIGURE 3 may be considered with respect to a write-read-write cycle involving Rows 1 and 2 which rows may be considered to initially contain the words 0 0 0 0 0 0 0 0 and 0 0 0 0 0 0 0 0. Assuming that intelligence in serial bit form includes the words 1 0 1 0 1 1 1 1 and 1 1 1 1 0 0 0 0 and that peripheral equipment not shown steers such words into paths associated with Row 1 and Row 2 respectively, the pulses associated with each bit of each word will energize trigger sources simultaneously energizing appropriate write and inhibit drivers. Considering a parallel input of the first word, the write driver for Row 1 will energize winding 48 and the inhibit drivers for Columns 2 and 4 will energize windings 44 and 92. In the manner above described with reference to FIGURES 1 and 2, the Row 1 cores in Columns 1, 3, 5, 6, 7 and 8 will be driven to the One state shown in FIGURE 2 by the application of a write pulse and cores in Columns 2 and 4 will remain in the Zero state due to the combined MMF effect of pulses on both the write and inhibit windings threading such cores. The particular intelligence stored in the cores of Row 2 and the remaining rows will not be disturbed for the reasons above described. For example, the cores 70 and 80 which are in the Zero state prior to the writing operation in Row 1, remain in the Zero state since the write winding 72 for Row 2 is not energized and the only MMF acting upon the cores is that produced in winding 64 on core 80; there being no MMF applied to the inhibit winding 44 of Column 1.

The second word may be written into Row 2 by the energization of the Row 2 write driver producing a write pulse on winding 72 and the energization of the inhibit drivers for Columns 5, 6, 7 and 8; inhibit drivers for Columns 1, 2, 3 and 4 not being energized. The Row 2 cores in Columns 1, 2, 3 and 4 will be driven to the One state and the cores in Columns 5, 6, 7 and 8 will remain in the Zero state. As above described with respect to the write cycle for Row 1, no cores of remaining rows will be disturbed. The bit content for Row 1 will be disturbed but the intelligence content will not be destroyed. The writing of the second words 1 1 1 1 0 0 0 0 in energizing inhibit drivers for Columns 5, 6, 7 and 8 will produce MMF's driving the One Row 1 cores in such columns into the Disturbed One state so that the intelligence content of the first word might be visualized as 1 0 1 0 $1_d$ $1_d$ $1_d$ $1_d$. The cores of Row 1 in Columns 1, 2, 3 and 4 will see no inhibit MMF since the inhibit drivers for such columns are not energized.

Considering now that it is desirable to read-out the words stored in Row 1 and Row 2, the prime winding 52 is first energized driving the cores which are then set into the Primed One or Primed Disturbed One state and leaving the cores then Clear in the Zero state. The intelligence content of Rows 1 and 2 may then be considered as $1_p$ 0 $1_p$ 0 $1_{pd}$ $1_{pd}$ $1_{pd}$ $1_{pd}$ and $1_p$ $1_p$ $1_p$ $1_p$ 0 0 0 0. The application of a trigger pulse to read drivers may be applied with the winding 54 of Row 1 being first energized to produce an output on the sense windings threading each core of Row 1. In the manner above described, substantially large voltages will be induced representing a One output on the sense windings for Column 1, 3, 5, 6, 7 and 8 there being an insubstantial output on the windings for Colums 2 and 4. The intelligence content of Row 1 may then be considered as $1_r$ 0 $1_r$ 0 $1_r$ $1_r$ $1_r$ $1_r$ which is identical to 1 0 1 0 1 1 1 1 as shown in FIGURE 2. A subsequent read-out of the word stored in Row 1 would in the above manner include the application of prime followed by the application of a read pulse with an identical output. The application of the trigger pulse to the read driver for Row 2 will energize winding 74 producing a substantial output on each of the sense windings of Columns 1, 2, 3 and 4; the resulting intelligence being $1_r$ $1_r$ $1_r$ $1_r$ 0 0 0 0 which is 1 1 1 1 0 0 0 0. If, at some later period, it is desired to read-out either Row 1 and/or Row 2, the application of prime followed by the sequential application of read pulses will again produce outputs representative of the intelligence content of the row or rows involved.

Considering now that it is desired to change the content of Row 1 by writing the word 1 1 0 0 0 0 1 1, the write winding 72 will be energized and the inhibit windings for Columns 3, 4, 5 and 6 energized, the inhibit windings for Columns 1, 2, 7 and 8 being not energized. The cores in Row 2 for Columns 1 and 2 will not be disturbed, the cores in Columns 3 and 4 being driven to the Disturbed One state. The cores for Columns 5, 6, 7 and 8 will remain in the Zero state. The content of Row 1 and Row 2 will then be 1 1 0 0 0 0 1 1 and 1 1 $1_d$ $1_d$ 0 0 0 0 (1 1 1 1 0 0 0 0), respectively.

In the foregoing manner, intelligence may be written into the matrix shown in FIGURE 3 on a row-by-row basis and may be read out of the matrix on a row-by-row basis in a non-destructive manner. If it is desired to clear out the matrix, a suitable inhibit source may be interconnected to each of the inhibit windings thereby driving each of the cores to the Zero or Clear state. In a similar manner, all write drivers may be energized to load the matrix with Ones.

In an actual unit employing the technique of the invention, a multi-path core employing magnetic material identified as Indiana General Material No. 5209 supplied by the Indiana General Corporation of Valparaiso, Indiana, included the approximate dimensions 193 x 100 x 25 mils overall with a major aperture 100 x 50 mils and a minor write aperture of 16 mils diameter and 18 mils diameter for the read diameter (in inches). The write winding employed No. AWG triple Formvar coated wire wound as indicated in FIGURE 1 with two turns through the minor aperture and one turn through the major aperture; the inhibit winding being of 36 AWG Formvar wire having one turn threading the same aperture. The read winding was of 36 AWG Formvar wire including one turn through the read apertures; the prime winding including 36 AWG Formvar wire having one turn encircling the inner leg of the core at the read aperture. The sense winding was formed of 36 AWG Formvar wire having one turn about the outer leg adjacent the read aperture. The write pulse employed had an amplitude of approximately 1,000 milliamperes and 3.0 microseconds duration. The inhibit pulse employed included a pulse of 2,000 milliamperes of 5.0 microseconds duration; the prime pulse was of 300 milliamperes amplitude and 7.0 microseconds duration and the read pulse of 600 milliamperes amplitude and 3.0 microseconds duration. An 850 bit matrix was formed by supporting the 850 cores by the windings as shown in FIGURE 4 being secured to an insulating frame. The matrix operated satisfactorily at a 50,000 read-write cycle rate in the presence of substantial temperature variations and current-voltage variations.

Tests of the above mentioned actual unit constructed in accordance with an embodiment of the invention demonstrated that excessive read pulse amplitude would not operate to disturb the core Zero state because the read pulse MMF is applied in a sense to drive $L_4$ in a "clear" sense. Control of the read pulse rise time in the manner described with respect to prime pulse rise time was found to permit $L_3$ to completely switch before reaching the threshold of a core major path about aperture 12 thus preventing the read pulse MMF from clearing the core when in its One state. The driver simplifications which are possible due to the inherent lack of pulse ampiltude sensitivity of both prime and read circuits is of considerable advantage.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. A device for storing and manipulating intelligence in binary form including a core of saturable magnetic material capable of being driven into distinct stable states of magnetization defined by the sense of flux orientation in said core, intelligence input means linking the core including first means linking one part of said core in a sense to drive the core into a distinct stable state representative of a binary one with flux set in a first pattern in said core and second means linking a second part of said core to drive the core into a different stable state also representative of a binary one with flux set in a second pattern in said core, the simultaneous application of drive via said first and second means operating to drive the said first and second parts and the core into a stable state representative of a binary zero with flux oriented in a third pattern in said core; driving means linking a third part of the core including third means in an orientation to drive the core to switch flux in said third part from the pattern set in said first and second patterns in said core to a fourth pattern of set flux and to leave flux oriented in said third pattern substantially unswitched and fourth means to switch flux from said fourth pattern back to said first or second patterns whereby to produce a switching of flux in said core representative of the particular stable state then existent and output means linking said third part of said core to respond to flux switched in said third part of said core to produce an output signal when said core is in said states having said fourth pattern of set flux to represent a binary one output and to produce substantially no output signal when said core is in a binary state having flux orientation in said third pattern.

2. The device of claim 1 wherein the said core includes major and minor apertures and said first means includes a winding threaded down through said minor aperture, then up through said major aperture and down through said minor aperture and said second means includes a winding threaded down through said minor aperture, each with respect to a given polarity of applied drive current.

3. The device of claim 1 wherein said core includes major and minor apertures and said driving means includes a first winding threaded down through said major aperture and up through said minor aperture and a second winding threaded down through said minor aperture with respect to a given polarity of applied drive current and said output means includes a winding threaded through said minor aperture with respect to voltage induced in said winding responsive to said flux changes.

4. A device for storing and manipulating intelligence in binary form including a plurality of cores of saturable magnetic material capable of being driven into distinct stable states of magnetization defined by the sense of flux orientation in a core, the plurality of cores being arranged in rows and columns, intelligence input means a first part of each of linking the cores including means individual to each row of cores and the first part thereof to drive the cores in a given row into a distinct stable state representative of a binary one with flux set in said cores in a first pattern and including second means linking a second part of said cores individual to each column of cores to drive the cores of such column into a different stable state also representative of a binary one with flux set in a second pattern, in said core, the simultaneous application of drive via a given row and column means operating to drive a single core common to the row and column into a stable state representative of a binary zero with flux set in a third pattern in said core; read-out drive means linking the plurality of cores through a third part of each of said cores including means individual to each row of cores oriented in a sense to drive the cores to switch flux in the said third part of a core when said cores are in said state representing a binary one with flux set in said first and second patterns representative of the particular binary One state then existent and leave said flux unswitched in said core when said core is in said state representative of a binary zero with flux set in a third pattern and output means individual to each column of cores adapted to respond to flux changes in a given row of cores to produce an output signal representative of each binary one state defined by said first and second patterns of flux set into said core and substantially no output signal representative of each binary zero state having flux oriented in said third pattern in a given core common to a given row of cores.

5. The device of claim 4 wherein each of said plurality of cores of saturable magnetic material include input and output minor apertures and a major aperture generally symmetrically disposed therebetween and the input means linking the cores includes first windings individual to each row of cores passing through the input aperture of each core, then through the major aperture of each core and back through the input aperture of each core of a given row and a second winding individual to each column of cores passing through the input aperture of each core in a given column of cores.

6. The device of claim 5 wherein said plurality of cores of saturable magnetic material include input and output minor apertures and a major aperture generally symmetrically disposed therebetween and the read-out drive means linking the plurality of cores includes a prime winding threading the output minor aperture of each core of the plurality of cores, read windings threading the output minor aperture of each core individual to each row of cores, and the said output means includes a winding threading the output aperture of each core individual to each column of cores.

7. An intelligence storage and manipulating device including a magnetic core of saturable magnetic material capable of being driven into distinct stable states representative of intelligence, first input means linking a distinct portion of said core and oriented in a sense to drive said core into a first stable state of magnetization with flux set in a first pattern in said core, second input means linking a different portion of said core and oriented in a sense to drive said core into a further stable state of magnetization with flux set in a second pattern in said core, the energization of said first and second means operating to drive said core into a different state of magnetization with flux set in a third pattern in said core, an output means linking yet a further portion of said core to respond to flux switched in said further portion to produce an output voltage when said cores are in said first and second states of magnetization with flux set in said first and second patterns and to produce substantially no output voltage when said cores are in said different state of magnetization with flux in said third pattern, said output means further including a first driving means linking said further portion of said core and in a sense of orientation relative to flux set in said first and second patterns to switch said flux relatively slowly to prime flux under said output means and second means linking said core in a different manner and in an orientation to switch said flux rapidly under said output means to produce said output voltage and restore said core to a state of magnetization having said first or said second flux patterns to thus provide a nondestructive read-out of said device.

8. A device for storing and manipulating intelligence in binary form including a multi-aperture core of saturable magnetic material capable of being driven into distinct stable states of magnetization, the core including input and output minor apertures and a major aperture forming major and minor paths of possible flux closure through the core material, intelligence input means including a first winding threaded through said input minor aperture and the major aperture and a second input winding threaded through said input minor aperture alone, the first winding being adapted to drive the core into a distinct stable state representative of a binary one by switching flux about the core major path responsive to applied drive current and the second winding being adapted to drive the core into a distinct stable state also representative of a binary one by switching flux about the core major path responsive to applied drive current, the simultaneous application of applied drive current to said first and second windings serving to drive the core into a different stable state representative of binary zero by switching flux about the core major path, drive means threading the output aperture and adapted to drive the core to produce flux changes localized about a minor path representative of the particular stable state then existent and sense means threading the output aperture and adapted to respond to said flux changes to produce a signal representative of either a binary one or zero.

9. An improved intelligence storage and manipulating device including a magnetic core of saturable material capable of being driven by applied magnetomotive force into distinct stable states of magnetization, the said core including a major aperture and minor apertures generally symmetrically disposed to define major and minor paths of core material capable of sustaining flux closure, a first input winding linking said core through a minor aperture and adapted to switch flux in a core major path and drive said core into a first stable state, a further input winding linking the same minor aperture and adapted to switch flux about a different major path to define a different stable state of magnetization, the energization of said first and second input means operating to switch flux in a major path to define yet a further stable state of magnetization, read-out means including first means linking a further minor aperture and adapted to switch flux in a minor path about said aperture, second means linking said further minor aperture and adapted to switch flux in a different path about said further minor aperture, and sense means threading said further minor aperture adapted to respond to flux changes occurring by reason of the operation of the second means to produce a voltage representative of the magnetization state of the core then existent.

10. An intelligence storage and manipulating matrix including a plurality of multi-aperture cores each capable of handling one bit of intelligence, the plurality of cores being divided into rows of cores, each capable of handling a word of intelligence comprised of a plurality of bits, the plurality of cores being further divided into columns of cores with the same relative core of a given row being common to a given column, write means individual to each said row including a winding threading a minor aperture of each core of the respective row, the energization of said write winding being adapted to drive each core into a state of magnetization representative of a binary one, inhibit means individual to each core of a given column including a winding adapted to drive each core of the respective column into a different state of magnetization representative of a binary one, the coincident energizing of write and inhibit windings being adapted to drive a core common to such windings into a further state of magnetization representative of binary zero, a prime winding threading the said plurality of cores and adapted to prime flux locally about a core minor aperture of each of said cores then in a state of magnetization representative of binary one, a read winding common to a given row of cores and adapted to switch flux locally about the core output minor aperture when such core is in a primed state of magnetization, sense windings common to a given column of cores and adapted to respond to flux changes about the minor output apertures caused by the energization of the read winding to produce an output pattern of pulses representative of the intelligence content of a given row of cores.

References Cited by the Examiner

UNITED STATES PATENTS

| | | | |
|---|---|---|---|
| 3,149,314 | 9/1964 | King. | |
| 3,206,733 | 9/1965 | Briggs. | |
| 3,213,434 | 11/1965 | Russell | 340—174 |

References Cited by the Applicant

UNITED STATES PATENTS

| | | |
|---|---|---|
| 2,869,112 | 1/1959 | Hunter. |
| 2,926,342 | 2/1960 | Rogers. |
| 2,934,747 | 4/1960 | Slonczewski. |

JAMES W. MOFFITT, *Acting Primary Examiner.*

G. LIEBERSTEIN, *Assistant Examiner.*